June 14, 1932.　　　E. R. PERSON　　　1,863,251
EDGE SHAPING MACHINE
Filed Feb. 14, 1929　　　4 Sheets-Sheet 3
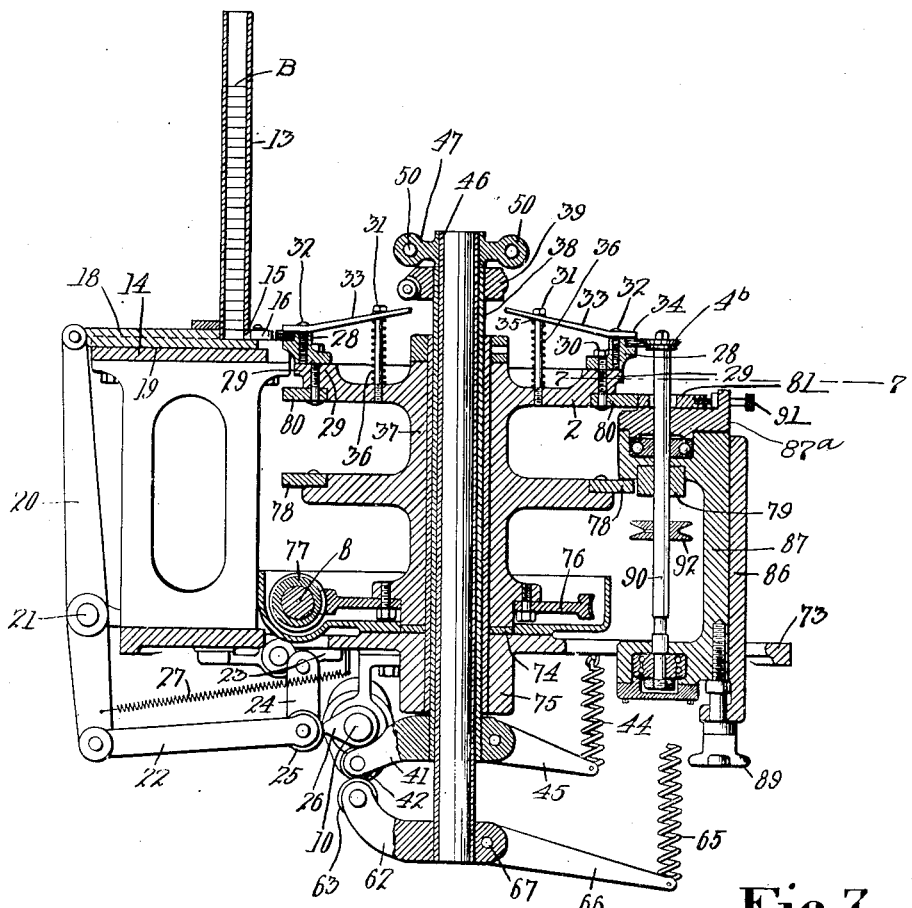
Fig. 7.
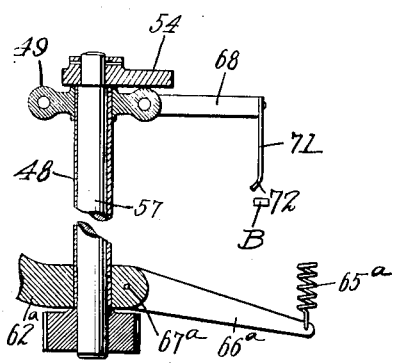
Fig. 3
Fig. 6
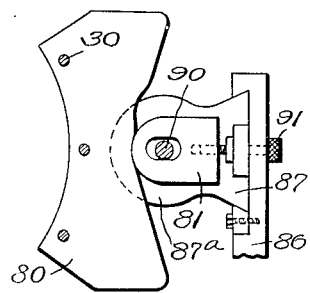
Inventor
E. R. Person
By his attorneys
Southgate Fay & Hardy June 14, 1932.  E. R. PERSON  1,863,251
EDGE SHAPING MACHINE
Filed Feb. 14, 1929  4 Sheets-Sheet 4

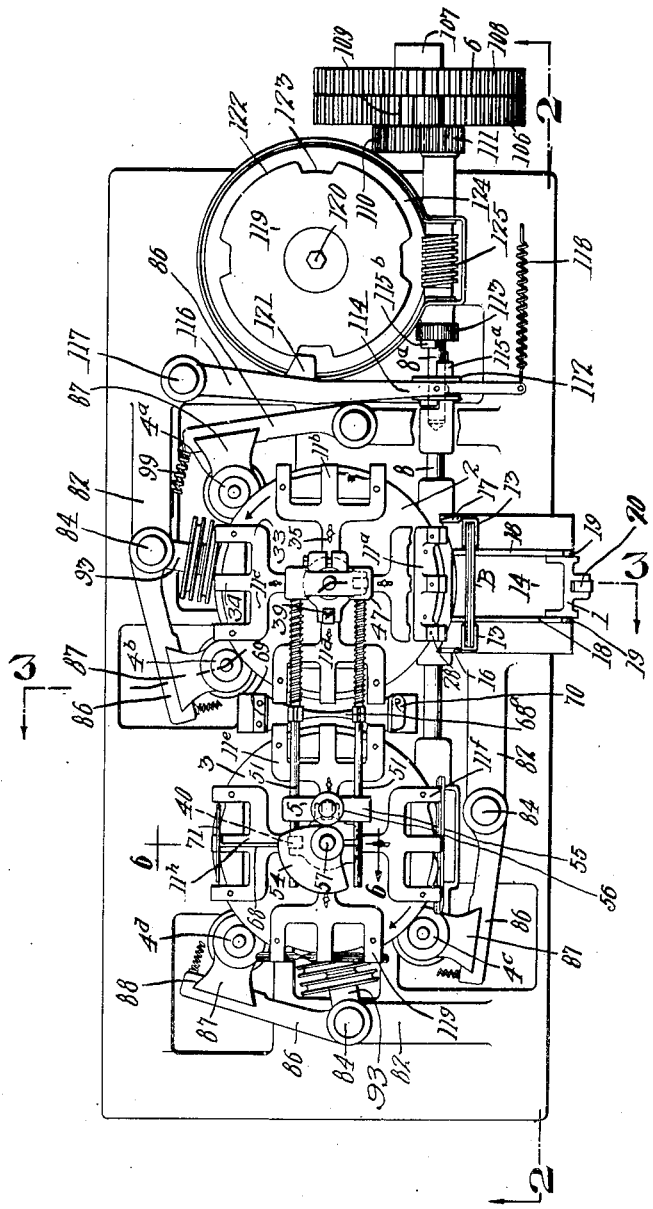

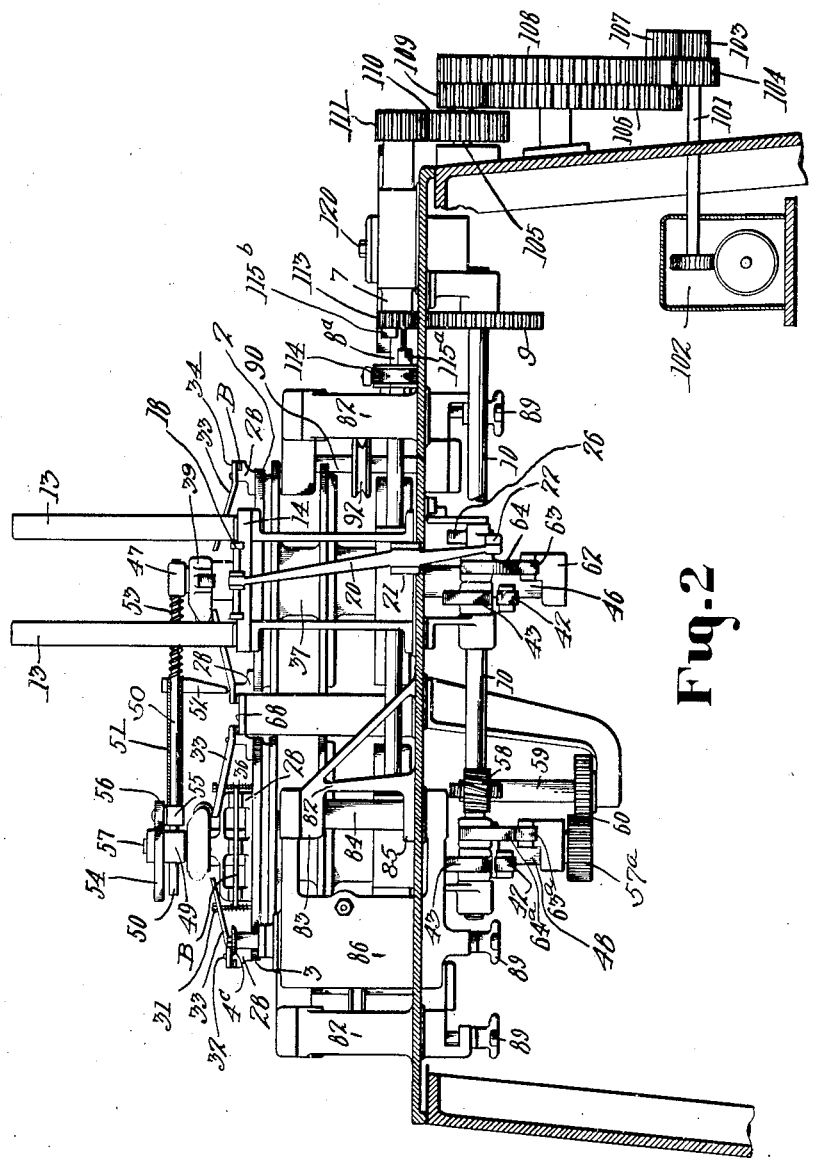

Inventor
E. R. Person
By his attorneys
Southgate Fay & Hanby

Patented June 14, 1932

1,863,251

UNITED STATES PATENT OFFICE

EARL R. PERSON, OF LEOMINSTER, MASSACHUSETTS, ASSIGNOR TO DU PONT VISCOLOID COMPANY, OF WILMINGTON, DELAWARE, A CORPORATION OF DELAWARE

EDGE SHAPING MACHINE

Application filed February 14, 1929. Serial No. 339,938.

This invention relates to beveling articles of manufacture and more particularly to a mechanical device for automatically routing or beveling articles having irregular outlines, such as tooth brush handles, etc.

According to the methods heretofore known and in use, work of this character is done by hand. The article is cut to its general shape by the use of a saw or a so-called blanking or outline cutter; the article is then shaped on a hand beveling machine which ordinarily comprise a horizontal table having a vertical spindle projecting through it near the center, the spindle being provided with a cutter. In use, the operator holding the article down on the table slides it against the cutter and turns it around as required. Another method use for making articles such as brush handles is to cut rectangular pieces of the material, such as celluloid, and press these pieces between the two halves of a die, thus obtaining the desired outline and rounding the edges, etc.

This invention has as an object the automatic beveling of articles. A further object is to obtain uniformity in shape of the articles so beveled. A still further object is to form articles from rectangular blanks without pressing and without first cutting the blanks to the outline desired. Other objects will appear hereinafter.

These objects are accomplished by applicant's machine which automatically takes the rough article blanks, carries them past a series of cutters and discharges them completely formed as to outline and contour.

While the invention is capable of embodiment in many different forms, for the purpose of illustration I have shown only one form in the accompanying drawings, in which Fig. 1 is a plan view of the machine;

Fig. 2 is a front sectional elevation, taken on the line 2—2 of Fig. 1, the bed plate being sectioned to remove the front wall thereof to show the construction;

Fig. 3 is a sectional view on a large scale taken substantially on the line 3—3 of Fig. 1;

Fig. 6 is a fragmentary section on the line 6—6 of Fig. 1, and Fig. 7 is a horizontal sectional view on the line 7—7 of Fig. 3.

Figure 5:
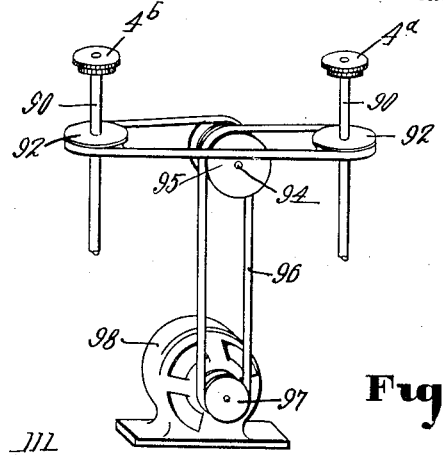
Fig. 5 is a view showing the method of driving the cutters.

Referring now more particularly to Fig. 1, the illustrated machine comprises in general a feeding mechanism designated generally as 1 for feeding the blanks B to the forming parts of the machine; a pair of drums 2 and 3 for carrying the blanks through the machine; cutters $4^a$, $4^b$, $4^c$ and $4^d$ for shaping the blanks; mechanism designated generally as 5 for transferring the blanks from the drum 2 to the drum 3 in their progress through the machine, and a driving mechanism designated generally as 6 for driving the machine. The driving mechanism intermittently drives through the connections designated generally as 7 and a shaft 8 from which are operated the drums 2 and 3. The driving mechanism further drives through the connection 9 and shaft 10, the feeding mechanism 1, the shifting mechanism 5, the blank holders $11^a$, $11^b$, $11^c$, $11^d$, $11^e$, $11^f$, $11^g$, and $11^h$, carried by the drums and the ejecting means (Fig. 6) for removing the blanks from the holder $11^h$.

In the general operation of the machine, while the drums 2 and 3 are stationary, a blank is fed by the feeding mechanism 1 to a holder, as $11^a$, positioned in receiving relation to the feeding mechanism. Upon rotation of the drum 2, the blank is carried by its holder past the cutters $4^a$ and $4^b$ which shape the upper and lower edges of one side of the article in the present machine. The blank is then shifted by the mechanism 5 from the holder now occupying the position $11^d$ to the holder $11^e$ and while held by this holder is, upon rotation of the drum 3, carried past the cuttrs $4^c$ and $4^d$ which shape the upper and lower edges of the other side of the blank. By further rotation of the drum 3 the holder carrying the blank is brought to the position $11^h$ whereupon the ejecting mechanism ejects the completely shaped article from the machine.

In the normal operation of the machine, the drums 2 and 3 move and stop synchronously, each of the holders being in turn brought to rest before the feeding mechanism 1 to receive a blank, with the result that there are seven blanks being simultaneously operated upon in the machine, including the blank just being received, the blank just being discharged and the blank in the shifting apparatus. It will be understood that the specific number of holders and cutters will vary and the specific shapes of the cutter guiding means will vary in different machines, depending upon the number of blanks it is desired to operate upon simultaneously and upon the specific shape to be imparted to the finished article.

I shall now describe in detail the various mechanisms and their accessories briefly referred to above. The feeding mechanism 1 comprises the hopper 13 which comprises mated channel sections 13 adapted to hold formed blanks in horizontal position one above the other. The channel sections 13 are mounted upon a base plate 14 and are cut away in their forward walls, as indicated at 15, to permit the discharge of the blanks. The blanks are discharged from the bottom of the hopper through the apertures 15 and the movable guides 16 and 17 by pushing the fingers 18 traveling in slots 19 in the base plate 14. These fingers are reciprocated by the lever 20, fulcrumed at 21 to the machine frame and actuated by the link 22 suspended from the bracket 23 by the swinging arm 24 and carrying the roller 25 wiped by the cam 26 and pulled toward "retreat" position by the action of the spring 27. The wiper cam 26 is carried by and actuated by the shaft 10.

Upon ejection from the hopper 13 by the fingers 18 the blank is received in a holder, as 11ª. The holders 11ª, etc. are, in the present machine, all alike and are operated in the same manner, hence a description of one will suffice for all. Referring now more particularly to Figs. 1 and 3 a holder comprises a seat plate 28 secured to the head plate 29 of the revolving drum 2 or 3, as indicated at 30, the seat plate presenting, in the present instance, three seats 28 (Fig. 1) for receiving the blank. Also secured to the plate 28 by a bolt 31 and screw 32 is a finger device 33 mating with its three fingers 34 and seats 28. The finger device is somewhat loosely mounted at 35 to permit vertical oscillation (Fig. 3) and the finger device is urged toward "closed" position by the expansion spring 36 expanding between the finger device and the plate 29, the bolt 31 being passed loosely through the finger device.

For the purpose of opening the holder, i. e., oscillating the finger device upon its fulcrum 32, and against the action of the spring 36, the following mechanism is provided. Within the hub 37 of the drum, as 2, is mounted a sleeve 38 (Fig. 3), the drum being freely rotatable thereon. Upon the upper end of this sleeve is fast mounted an actuating block 39 which makes contact with the finger device 33 of the blank holder immediately facing the feeding hopper and occupying the position 11ª and likewise making contact with the finger device of the blank holder immediately facing the drum 3 and occupying the position 11ᵈ. The corresponding block for operating the blank holders and carried by the drum 3 is positioned to actuate the finger of the blank holder immediately facing the drum 2 and occupying the position 11ᵉ, as shown at 11ᵉ in Fig. 2, and to actuate the finger of the blank holder in discharge position and occupying the position 11ʰ, as shown at 40 in Fig. 1. The sleeve 38 carries at its lower end and clamped thereto a roller carrier 41, carrying the roller 42. This roller is wiped by the cam 43 (Fig. 2) carried by the shaft 10. The cam 43 contacting the roller 42 pulls the sleeve 38 downward and the sleeve is returned to the upper position by the action of the contractile spring 44 which is supported at the bed plate and fastened to the arm 45, this arm being rigidly attached to the carrier 41. In operation, upon rotation of the shaft 10, the sleeve 38 is pulled downward and the fingers 34 open to permit the reception of a blank in the holder occupying position 11ª on the drum 2 and to permit the reception of a blank in the holder occupying position 11ᵉ on the drum 3 and the discharge of a finished article from the holder occupying position 11ʰ. Thereafter, the sleeve 38 is returned to initial position freeing said fingers 34 and permitting the springs 36 to return the fingers to clamping position.

Next to describe the mechanism heretofore generally designated as 5, for shifting the blanks from the holder on drum 2 occupying position 11ᵈ to the facing holder on drum 3 occupying position 11ᵉ. Carried at the upper end of a sleeve 46, which passes through the sleeve 38 and the drum 2, is a guide support 47 and similarly mounted upon the sleeve 48 which passes through the drum 3 is a mating guide support 49. These guide supports carry fixed thereto guides 50, in the character of rods as shown in Figs. 1 and 2. Slidably mounted upon each of these rods 50 are sleeves 51, and at the end of each of these sleeves 51 is fixed a shifter finger 52. On each of the rods 50, between the guide carrier 47 and the sleeves 51 are expansion springs 53 which return the fingers 52 after they have been forced over by the action of the cam 54. Carried upon a block 55 fixed to the sleeves 51 is a cam roller 56. This cam roller 56 contacts with the cam 54 which is fixed to the shaft 57. The shaft 57 is rotated from the shaft 10 by the spiral gear connection 58, jack shaft 59 and the gears 57ª and 60.

For the purpose of moving the blank B from the blank holder 11ᵈ to the blank holder 11ᵉ the fingers 52 mounted on sleeve 51, are moved to the right by the cam 54, just beyond the blank in the holder 11$^d$. The fingers 52 then drop behind the blank in the holder occupying position 11$^d$ and on the return or moving of the fingers 52 to the left by the springs 53 the blank is shifted to the holder 11$^e$. The fingers 52 are now moved up out of engagement with the blank by the following described mechanism.

At the lower end of the sleeves 46 and 48 are clamped the roller supports 62 and 62$^a$, carrying rollers 63 and 63$^a$ for contact by the cams 64 and 64$^a$ respectively on the shaft 10. These cams, upon rotation of the shaft 10, lower the supports 47 and 49, thus lowering the fingers 52. The rollers 63 and 63$^a$ are held in contact with the cams 64 and 64$^a$ respectively, by contractile springs as 65 and 65$^a$ (Figs. 3 and 6) attached to the frame and to the roller supports by arms as 66 and 66$^a$, rigidly attached to the roller supports as indicated at 67 and 67$^a$, and these springs 65 and 65$^a$ return the sleeves 46 and 48 to the normal or raised position.

As will be understood, the timing of the mechanism imparting the reciprocatory motion to the fingers 52, and the mechanism for lowering and raising the fingers is such that the fingers are in raised position above the blank at the time they have reached a position forward of the blank, thus not interfering when the same are lowered in the rear of the blank before their return motion is begun, and remain lowered during their return motion, thereby pushing the blank to the left and on to the holder occupying position 11$^e$. Furthermore, the timing is such that the fingers of the holder occupying position 11$^d$ are open, thus releasing the blank at least by the time that the fingers 52 begin their return motion; and the fingers of the holder occupying position 11$^e$ are open to permit the fingers 52 to position the blank in the holder before return of the fingers 52 to the initial position. During their passage from the drum 2 to the drum 3, the blanks are supported by the base plate 68$^a$ and pass between the fixed guide 69 and the movable guide 70. The guide 69 is fixed on the frame while the guide 70 is spring-pressed and pivoted to hold the blanks yieldingly against the guide 69.

The ejecting means hereinbefore designated and shown more particularly in Fig. 6, is also operated from the shaft 10, the arrangement being as follows: On the rear (Fig. 2) of the guide support 49 mounted on the sleeve 48 is an arm 68 (Fig. 6) extending over the holder occupying position 11$^h$. This arm carries downwardly projecting spring members 71 of such a contour and so positioned that upon descent of the guide support 49, as above described, the spring members 71 will contact the blank on its inner side, that is, the side immediately adjacent the vertical walls of the seat plates 28 (Fig. 3) and force the blanks outward from the seats sufficiently to cause them to overbalance and fall therefrom, whereby they are discharged from the machine. It will be noted that the spring member 71 is curved, as indicated at 72 (Fig. 6), to enable it to exert a wedge action upon the blank during the descent of the arm.

As hereinbefore stated, the shaft 10 is operated through the connection 9, this connection being as follows: The drums 2 and 3 are similarly mounted and driven and therefore a description of one will suffice for both. Referring now to Fig. 3, the drum 2 rests upon and is rotatable with respect to the bed plate of the machine frame 73, an intermediate bearing plate 74 being used, if desired. The portion 75 also provides a radial bearing for the various sleeves enclosed thereby, these various members serving to locate the drum vertically. At the lower portion of the drum is carried a worm gear 76, meshing with a worm 77 carried by the hereinbefore mentioned shaft 8, whereby the drum is driven from the shaft 8. It will be understood that the worm drives for the drum 2 and the drum 3 are of opposite effect since the drum 2 is rotated in an anti-clockwise direction and the drum 3 in a clockwise direction.

Intermediate the length of the drum is carried a former plate 78 for guiding contact with the follower 79. At the upper end of the drum is provided a second former plate 80 for contact with a follower 81. These former plates 78 and 80 are immediately beneath the blank holders, there thus being eight sets of them, one set under each blank holder. These former plates, or cutter guiding means, may be varied in shape as stated above, depending upon the specific form to be imparted to the finished article.

The cutters 4$^a$, 4$^b$, 4$^c$, and 4$^d$ may be varied in number and in shape, depending upon the form to be imparted to the finished article. These milling cutters are mounted and driven in the following manner. The bed plate 73 on the machine carries a number of brackets 82 equal in number to the number of cutters (in this case 4) upstanding from the plate, each of these brackets providing the upper bearing 83 for a stationary fulcrum pin 84, the lower bearings 85 for the pins being provided by the bracket 82. Each of the fulcrum pins 84 carries fulcrumed thereon a horizontally swinging arm 86 (Figs. 1, 2 and 3). Each arm carries a carriage 87, vertically slidable and adjustable thereon, the same having a dovetailed connection 88 with the arm and being vertically adjustable by the adjusting screw 89. Each carriage is provided with a cap 87$^a$ which supports the follower 81. Each carriage 87 rotatably supports a spindle 90 (Fig. 3) carrying at its upper end a cutter as 4$^b$. The carriages also carry followers 79 and 81 for contact with the former plates 78 and 80, as above described, the upper follower 81 being horizontally adjustable by the adjusting screw 91. The spindle carries and is driven by a sheave 92.

Conveniently, and as here shown, a pair of cutters as 4ᵃ and 4ᵇ, or 4ᶜ and 4ᵈ, may be driven from a single motor, there being a separate motor provided for each pair of cutters. This is conveniently done as indicated in Figs. 1 and 5. As there shown, two opposite fulcrum pins 84 carry each a projecting arm 93 supporting a bearing pin 94 for a double sheave 95. A belt 96 connects the sheave 97 of a motor 98, the double sheave 95 and the sheaves 92 on the spindles 90 carrying the cutters, the belt being threaded about the sheaves in such manner that both cutters of a pair are driven in the same direction, the cutters rotating oppositely to the direction of the drum with which they are immediately related. The followers 79 and 81 are held against the former plates 78 and 80 by contractile springs, as 99 (Fig. 1) connected between the machine frame and swinging arm 86. Furthermore, the pull of the driving belts 96 is such as to draw the arms 87 towards the work. As will be understood, the four cutters of the machine are desirably driven at substantially the same speed in order that each may perform its full cutting operation substantially synchronously with the others. Any suitable device (not shown) for synchronizing the motors being used as preferred.

Figure 4:
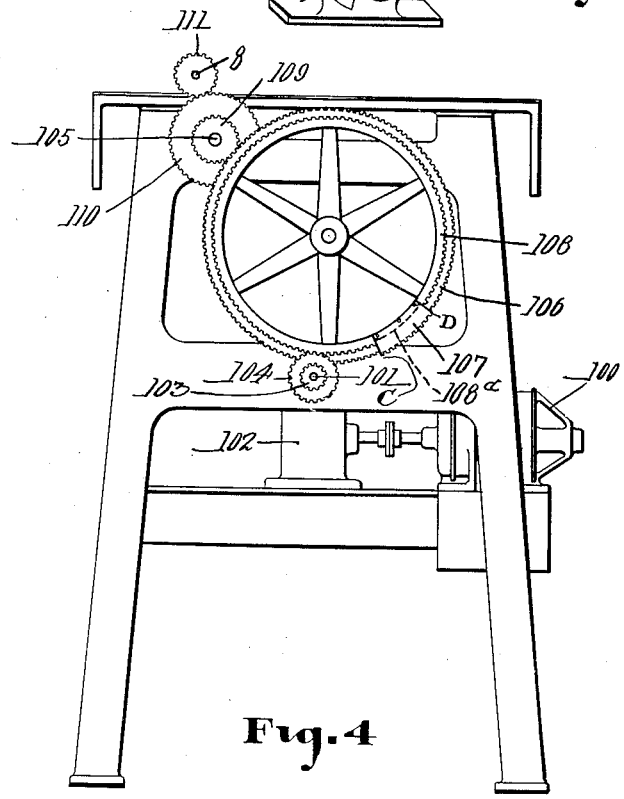
Fig. 4 is a view in elevation of the motor drive and immediately related parts.

Next, to describe the driving of the shafts 8 and 10 and the mechanism for synchronizing and controlling the motions thereof. Referring more particularly to Figs. 1, 2 and 4, the machine, with the exception of the cutters, is driven from a motor 100 driving the shaft 101 through the reduction gear box 102. The shaft 101 carries fast thereupon the gear 103 and the gear 104. These two gears are adapted to drive the shaft 105 at different speeds (low and high) by means of the gearing which comprises a gear 106, a gear segment 107 of a larger diameter for meshing with the gear 103 and a gear 108 for meshing with the gear 104. The gear segment 107 is carried by the gear 108 and is of a diameter to mesh with the gear 103 for but a short circumferential length as indicated at C—D Fig. 4. Correspondingly, the gear 108 is cut away at 108ᵈ so that it will be free of the gear 104 throughout the length C—D. With this construction, with the shaft 101 in continuous rotation, the gear 104 will drive the gear 108 of the change gears through part of a revolution except for the distance C—D. When the portion C—D of the gear 108 is reached, the shaft 101 will drive the gear segment 107 through the circumferential distance C—D. The result of this is that while the shaft 101 is driving the shaft 105 through the gears 104 and 108, the shaft 105 is driven at a relatively high speed, and when the shaft 101 is driving the shaft 105 through the gears 103 and segment 107, the shaft 105 is driven at a relatively low speed. The shaft 105 carries the gear 109 meshing with the gear 106 and the gear 110 meshing with the gear 111 carried by the shaft 8ᵃ, whereby when the shafts 8ᵃ and 8 are in engagement through the action of the clutch 112, the drums 2 and 3 are driven as hereinbefore described. Thus, the drums invariably slow down as the blanks make contact with the cutters and speed up immediately thereafter.

Carried loosely upon the shaft 8ᵃ is a gear 113 in mesh with the gear 9 fast on the shaft 10 and by which the shaft 10 is driven. Keyed to the shaft 8ᵃ is the longitudinally slidable clutch unit 112 shifted by the clutch fork 114. The clutch unit 112 and the gear 113 are formed for driving engagement by the cooperative lugs 115ᵃ and 115ᵇ. The clutch fork 114 is carried by and forms a part of a lever 116 fulcrumed at 117 to the bed of the machine, and the lever is urged by the contractile spring 118 to hold the clutch in engagement with the gear 113.

For forcing the lever 116 in such direction (to the left in Fig. 1) as to throw the clutch out of engagement with the gear 113, and into engagement with the shaft 8 to drive the same, there is provided the cam plate 119 mounted for rotation upon the bed plate at 120. The cam surface of the cam plate is arranged for contact with a dog 121 on the lever 116, the cam plate having circumferential portions, as 122, serving to hold the lever 116 in left-hand position (Fig. 1) and the clutch out of engagement with the gear 113, and in engagement with the shaft 8 and also the recess portion 123, permitting the spring 118 to pull the lever to the right and throw the clutch 112 into engagement with the gear 113 and out of engagement with the shaft 8. It will be understood that there are provided as many portions 123 as there are positions at which the drums stop to permit the holders to open and close, there being in the present instance four portions 123. The cam plate is driven by means of the worm wheel 124 fast therewith and rotatable about the center 120 and driven by the worm 125 on the shaft.

As many apparently widely different embodiments of this invention may be made without departing from the spirit and scope thereof, it is to be understood that I do not limit myself to the specific embodiments thereof except as defined in the appended claims.

1. A machine of the character described comprising a flat carrier, a plurality of clamps thereon, each clamp being arranged to clamp an article against the face of the carrier and position it with its outer edge overhanging and therefore exposed, shaping devices positioned in the path of movement of the articles, located in the plane of the carrier and operatable on the exposed outer edges of the articles, a second carrier in the same plane as the first carrier, transfer mechanism operating on a line intersecting the centers of the carriers to deliver the articles, shaped edge forward, into a clamp on the second carrier so that the rear edge of the article will similarly overhang the second carrier, all of the said clamps having spaced parts between which the transfer means may engage the blanks to move them out of one clamp and into the other, shaping devices adapted to operate on the outer edges of the articles in the clamps of the second carrier, means for rotating said shaping cutters for one carrier in opposite directions to those for the other carrier and for intermittently rotating said carriers in synchronism but in opposite directions in order to follow the grain on the opposite sides of the work.

2. A machine of the character described comprising a flat carrier, a plurality of clamps thereon, each clamp being arranged to clamp an article against the face of the carrier and position it with its outer edge overhanging and therefore exposed, shaping devices positioned in the path of movement of the articles, located in the plane of the carrier and operatable on the exposed outer edges of the articles, a second carrier in the same plane as the first carrier, transfer mechanism operating on a line intersecting the centers of the carriers to deliver the articles, shaped edge forward, into a clamp on the second carrier so that the rear edge of the article will similarly overhang the second carrier, all of the said clamps having spaced parts between which the transfer means may engage the blanks to move them out of one clamp and into the other, and shaping devices adapted to operate on the outer edges of the articles in the clamps of the second carrier.

In testimony whereof I have hereunto affixed my signature.

EARL R. PERSON.